(12) United States Patent
Oepen et al.

(10) Patent No.: US 6,852,797 B2
(45) Date of Patent: Feb. 8, 2005

(54) METHOD FOR PRODUCING POLYBUTADIENE LATEX WITH AN OPTIMIZED THERMAL CURRENT PROFILE

(75) Inventors: Sabine Oepen, Ellerstadt (DE); Michael Breulmann, Mannheim (DE); Norbert Güntherberg, Speyer (DE); Klaus-Dieter Hungenberg, Birkenau (DE); Norbert Niessner, Friedelsheim (DE); Bernhard Czauderna, Hirschberg (DE); Wil Duijzings, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/257,717

(22) PCT Filed: Apr. 24, 2001

(86) PCT No.: PCT/EP01/04616
§ 371 (c)(1),
(2), (4) Date: Oct. 16, 2002

(87) PCT Pub. No.: WO01/81438
PCT Pub. Date: Nov. 1, 2001

(65) Prior Publication Data
US 2003/0162889 A1 Aug. 28, 2003

(30) Foreign Application Priority Data
Apr. 26, 2000 (DE) .......................................... 100 20 355

(51) Int. Cl.$^7$ .......................... C08F 2/22; C08F 279/04
(52) U.S. Cl. ........................ 524/836; 525/86; 525/316; 525/942
(58) Field of Search .......................... 524/836; 525/316, 525/942, 86

(56) References Cited

U.S. PATENT DOCUMENTS 3,624,183 A * 11/1971 Leach et al. ................ 525/316
4,520,165 A * 5/1985 Zabrocki et al. ............. 525/84
5,354,800 A    10/1994 Suzuki et al.
5,763,521 A     6/1998 Claassen et al.

FOREIGN PATENT DOCUMENTS

| CA | 2215556 | 4/1998 |
| EP | 486 262 | 5/1992 |
| EP | 761 693 | 3/1997 |
| EP | 834 518 | 4/1998 |
| EP | 955 324 | 11/1999 |
| GB | 1094872 | 12/1967 |
| GB | 2 196 011 | 4/1988 |

* cited by examiner

Primary Examiner—Fred Teskin
(74) Attorney, Agent, or Firm—Keil & Weinkauf

(57) ABSTRACT

A polybutadiene latex is prepared by a process in which butadiene is polymerized by free radical emulsion polymerization in the presence of initiator and, if required, dispersants and further conventional assistants, the polymerization being carried out in the presence of reactive comonomers in such a way that the heat flow of 43 watt/kg solids content of the polymerization mixture is not exceeded. Owing to the presence of reactive comonomers, the reaction rate at the beginning of the reaction is increased, with the result that an overall flatter heat flow profile is obtained. A preferred reactive comonomer is styrene. Preferably, the process is carried out by a semi-batch procedure in which (a) in a first stage, a portion of butadiene and at least one portion of reactive comonomer in the form of an aqueous emulsion are initially taken with a thermal polymerization initiator and, if required, dispersants and further conventional assistants and the polymerization is initiated, (b) in a second stage, the remaining amount of butadiene and, if required, the remaining amount of reactive comonomer are added undiluted or in the form of an aqueous emulsion, if required with dispersants and, if required, further conventional assistants, as a feed.

13 Claims, 2 Drawing Sheets

METHOD FOR PRODUCING POLYBUTADIENE LATEX WITH AN OPTIMIZED THERMAL CURRENT PROFILE

The present invention relates to a process for the preparation of polybutadiene latex, the polybutadiene latex itself prepared in this manner, a process for the preparation of a polybutadiene graft copolymer, the graft copolymer itself, molding materials prepared therefrom and the use of the graft copolymers and molding materials.

Polybutadiene rubber, which can be used as a base for acrylonitrile/butadiene/styrene graft copolymers, is usually prepared by emulsion polymerization in a semi-batch process. In a first stage, a portion of butadiene is initially taken with an initiator as an aqueous emulsion and is prepolymerized and, in a second stage, the remaining amount of butadiene is added undiluted or in the form of an aqueous emulsion as a feed. The disadvantage of this process is the low reaction rate at the beginning of the feed and consequently a disadvantageous overall heat flow profile of the polymerization reaction. Whereas only little heat evolution is observable with little instantaneous addition at the beginning of feed, the heat flow profile in the further course of the polymerization reaction has a pronounced peak.

This is undesirable, especially in large plants, since a large heat flow adversely affects the operational safety of the plant and large cooling capacities have to be reserved for the reactor. In addition, with increasing reactor size, the removal of heat via the reactor wall becomes increasingly difficult owing to the decreasing surface area:volume ratio. Additional cooling capacity therefore has to be provided through evaporative coolers or internal or external heat exchangers.

EP-A 0 834 518 describes a process and an apparatus for the preparation of homo- and copolymers by the emulsion polymerization method, in which the reaction mixture present in the form of an emulsion is passed through an external circulation leading from the reaction vessel and back to it and comprising a heat exchanger.

EP-A 0 486 262 describes an emulsion polymerization process in which the feed rate is monitored by means of online reaction calorimetry so that a specific heat flow is not exceeded.

Heat peaks in the course of the reaction can be avoided by increasing the reaction rate at the beginning of the reaction, with the result that the heat flow profile of the reaction is flattened while the total heat of reaction remains constant.

EP-A 0 761 693 describes the use of redox initiator systems for increasing the reaction rate at the beginning of the emulsion polymerization. A monomer emulsion is initially taken and the initiator is metered in together with further monomer.

It is an object of the present invention to provide a process for the preparation of polybutadiene latex by emulsion polymerization, which process is easy to carry out and in which peaks in the heat flow profile of the polymerization reaction are avoided.

We have found that this object is achieved by a process for the preparation of polybutadiene latex, in which butadiene is polymerized by a free radical emulsion polymerization reaction in the presence of initiator and, if required, dispersants and further conventional assistants, wherein the polymerization is carried out in the presence of reactive comonomers in such a way that a heat flow of 43 watt/kg solids content of the polymerization mixture is not exceeded. Preferably, a heat flow of 39, particularly preferably of 34, watt/kg is not exceeded.

The heat flow profile of the polymerization can generally be characterized as follows:

during a first period of 10–700, preferably 10–600, particularly preferably 10–400, minutes, the change in the heat flow per unit time is 0.01–0.5, preferably 0.01–0.4, watt/(kg·min);

during a second period of 0–600, preferably 100–500, particularly preferably 100–400, minutes following the first period, the change in the heat flow per unit time is −0.1–0.1, preferably −0.05–0.05, particularly preferably −0.01–0.01, watt/(kg·min);

during a third period of 10–1000, preferably 100–800, preferably 200–800, minutes following the second period, the change in the heat flow per unit time is <0 watt/(kg·min).

Owing to the presence of reactive comonomers, the reaction rate at the beginning of the reaction is increased, with the result that an overall flatter heat flow profile is achieved.

Figure 1:
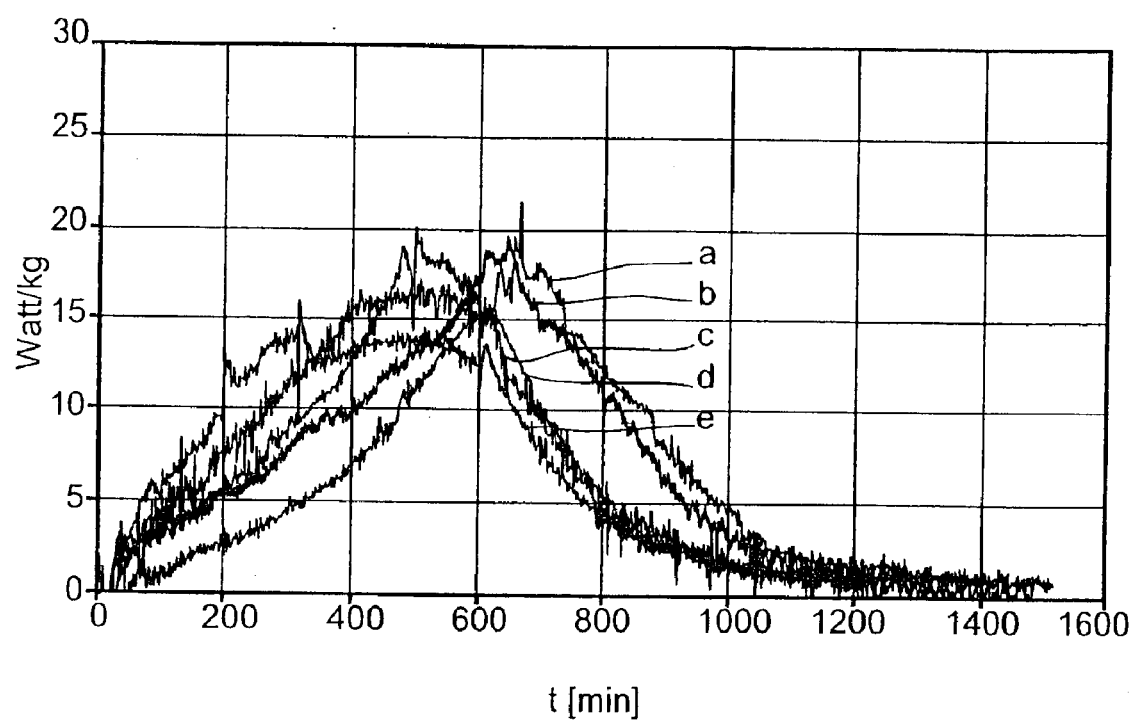
FIG. 1 shows heat flow curves for Examples a to e according to the invention.

Suitable reactive comonomers are in general ethylenically unsaturated monomers, such as styrene, styrene derivatives substituted on the nucleus by alkyl or halogen, α-methylstyrene, alkyl acrylates, such as n-butyl acrylate, acrylonitrile, methacrylonitrile and mixtures thereof. A preferred reactive comonomer is styrene.

The novel process can be carried out continuously or by a semi-batch procedure. Preferably, it is carried out by a semi-batch procedure in which (a) in a first stage, a portion of butadiene and at least one portion of reactive comonomer in the form of an aqueous emulsion are initially taken with a thermal polymerization initiator and, if required, dispersants and further conventional assistants and the polymerization is initiated;

(b) in a second stage, the remaining amount of butadiene and, if required, the remaining amount of reactive comonomer are added undiluted or in the form of an aqueous emulsion, if required with dispersants and, if required, further assistants, as a feed.

Suitable thermal polymerization initiators for initiating the polymerization reaction are all free radical formers which decompose at the chosen reaction temperature, i.e. both those which decompose through heat alone and redox initiators. Preferred initiators are free radical formers which decompose through heat alone, for example peroxides, such as sodium or potassium persulfate, and azo compounds, such as azobisisobutyronitrile. However, redox systems may also be used, in particular those based on hydroperoxides, such as cumyl hydroperoxide.

In the first stage of the semi-batch process, a portion of butadiene and at least one portion of reactive comonomer in the form of an aqueous emulsion are initially taken, the total amount of reactive comonomer preferably being initially taken. As a rule, conventional emulsifiers are present as dispersants, for example alkali metal salts of alkanesulfonic or alkylarylsulfonic acids, alkylsulfates, fatty alcohol sulfonates, salts of higher fatty acids of 10 to 30 carbon atoms, sulfosuccinates, ether sulfonates or resin soaps. Preferred emulsifiers are the sodium and potassium salts of alkanesulfonic acids or fatty acids of 10–18 carbon atoms.

The emulsifiers are usually used in amounts of from 0.5 to 5, preferably from 0.3 to 3, % by weight, based on the monomers used in the preparation of the polybutadiene latex.

Preferably, the proportion of the monomers (butadiene+ reactive comonomer) in the total amount of monomers in the initially taken mixture and feed is from 5 to 50, particularly preferably from 8 to 40, in particular from 10 to 30, % by weight. The feed can contain the remaining amount of butadiene and, if required, the remaining amount of reactive comonomer undiluted or likewise in the form of an aqueous emulsion, if required with dispersants. Preferably, the feed contains butadiene and the reactive comonomer in undiluted form. The feed is added in general in the course of 1–18, preferably 2–16, particularly preferably 2–12, hours. The monomer feed can be added in a plurality of portions, batchwise or continuously, over the total period. Usually, the water: monomer ratio is from 2:1 to 0.7:1. Initially taken mixture and feed may contain further conventional assistants, such as molecular weight regulators or buffer substances. The dispersants and further assistants can also be added separately from the monomer feed, for example batchwise in a plurality of portions, or continuously during a specific time interval. Molecular weight regulators are, for example, ethylhexyl thioglycolate, n- or tert-dodecyl mercaptan, terpinols or dimeric α-methylstyrene. Buffer substances are, for example, $Na_2HPO_4/NaH_2PO_4$, sodium bicarbonate or citric acid/citrate buffer.

The total amount of reactive comonomer in the initially taken mixture and, if required, in the feed is in general from 3 to 20, preferably from 5 to 10, % by weight of the total amount of monomers.

Usually, polymerization is effected at from 20 to 100° C., preferably from 30 to 80° C. The polymerization reaction is initiated by heating the polymerization mixture to the reaction temperature. In a preferred embodiment, the polymerization mixture initially taken in the first stage (a) is first prepolymerized after initiation of the reaction, and the addition of the remaining amount of monomer (stage (b)) is not begun until after a specific time. Usually, prepolymerization is effected for 0.1–3 hours, preferably 0.25–1 hour. After the end of the feed, postpolymerization is usually carried out for a further period until the desired monomer conversion has been reached. The polymerization reaction is preferably terminated on reaching a monomer conversion of about 90%.

The present invention also relates to a polybutadiene latex which can be prepared by one of the processes described above.

The present invention furthermore relates to a process for the preparation of butadiene graft copolymers, in which a polybutadiene latex is prepared by one of the processes described above and (c) in a further step, a graft layer comprising at least one vinylaromatic monomer, acrylonitrile and, if required, further ethylenically unsaturated monomers is grafted on.

In general, the graft layer is prepared from from 65 to 95, preferably from 70 to 90, particularly preferably from 75 to 85, % by weight of vinylaromatic monomer, from 5 to 35, preferably from 10 to 30, particularly preferably from 15 to 25, % by weight of acrylonitrile and from 0 to 30, preferably from 0 to 20, particularly preferably from 0 to 15, % by weight of the further ethylenically unsaturated monomer.

Suitable vinylaromatic monomers are styrene and styrene derivatives, such as α-methylstyrene. Styrene is preferred. Further monomers are in particular methyl methacrylate and acrylates, such as n-butyl acrylate, and N-phenylmaleimide. Methyl methacrylate in an amount of up to 20% by weight is very particularly preferred.

The graft layer can be prepared in one or more process steps. For example, in a two-stage grafting procedure, first styrene or α-methylstyrene alone and then styrene and acrylonitrile can be polymerized in two successive steps. It is advantageous to carry out the polymerization onto the grafting base once again in aqueous emulsion. It can be effected in the same system as the polymerization of the grafting base, it being possible to add further emulsifier and initiator. These need not be identical to the emulsifiers and initiators used for the preparation of the grafting base. The monomer mixture to be grafted on can be added to the reaction mixture all at once, batchwise in a plurality of stages or, preferably, continuously during the polymerization.

The graft polymerization can furthermore be carried out in the presence or in the absence of a molecular weight regulator, such as one of the above-mentioned molecular weight regulators.

In general, the butadiene graft copolymers are prepared from from 40 to 90% by weight of the novel polybutadiene latex and from 10 to 60% by weight of the monomers forming the graft layer.

The present invention also relates to butadiene graft copolymers which can be prepared by the process described above.

The novel butadiene graft copolymers can be mixed with thermoplastic copolymers comprising at least one vinylaromatic monomer, acrylonitrile and, if required, further ethylenically unsaturated monomers, such as commercial SAN polymers, and, if required, further thermoplastic polymers and conventional additives to give thermoplastic molding materials. Preferred molding materials contain from 5 to 80% by weight of butadiene graft copolymers and from 20 to 95% by weight of the thermoplastic copolymers, for example PSAN (polystyrene/acrylonitrile copolymer).

The novel butadiene graft copolymers and thermoplastic molding materials containing them can be processed by the known methods for processing thermoplastics, such as extrusion, injection molding, calendering, blow molding, compression molding or sintering.

The present invention also relates to the use of the butadiene graft copolymers and of the molding materials containing them for the production of shaped articles, films and fibers by extrusion, injection molding, calendering, blow molding, compression molding or sintering.

The Examples which follow illustrate the invention.

EXAMPLES

Preparation of the Butadiene Base

Comparative Examples a and b
(Preparation of the Butadiene Base Without Styrene as Comonomer)

66.14 liters of demineralized water, 339 g of potassium stearate, 177.0 g of sodium bicarbonate and 124.5 g of potassium persulfate were initially taken in a 160 l autoclave and heated to 67° C. 13.08 kg of butadiene were then added in the course of 30 minutes. 10 minutes after the beginning of this feed, 174.2 g of tert-dodecyl mercaptan were added. After the end of the first butadiene feed (initially taken monomer), prepolymerization was effected for 30 minutes. 39.24 kg of butadiene were then added in the course of 9 hours. 4 hours after the beginning of this main feed, 174.2 g of dodecyl mercaptan were added. 8 hours after the beginning of this main feed, a further 174.2 g of dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Example b is the repetition of Example a.

Example c
(7% by Weight, Based on the Total Amount of Monomers in the Initially Taken Mixture and Feed, of Styrene in the Initially Taken Monomer)

66.14 liters of demineralized water, 339 g of potassium stearate, 177.0 g of sodium bicarbonate and 124.5 g of potassium persulfate were initially taken in a 160 l autoclave and heated to 67° C. 9.42 kg of butadiene and 3.66 kg of styrene were then added in the course of 30 minutes. 10 minutes after the beginning of this feed, 174.2 g of tert-dodecyl mercaptan were added. After the end of the first butadiene feed (initially taken monomer), prepolymerization was effected for 30 minutes. 39.24 kg of butadiene were then added in the course of 9 hours. 4 hours after the beginning of this main feed, 174.2 g of dodecyl mercaptan were added. 8 hours after the beginning of this main feed, a further 174.2 g of dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Example d
(3.5% by Weight of Styrene in the Initially Taken Monomer, 3.5% by Weight in the Feed, Based in Each Case on the Total Amount of Monomers in the Initially Taken Mixture and Feed)

66.14 liters of demineralized water, 339 g of potassium stearate, 177.0 g of sodium bicarbonate and 124.5 g of potassium persulfate were initially taken in a 160 l autoclave and heated to 67° C. 11.25 kg of butadiene and 1.83 kg of styrene were then added in the course of 30 minutes. 10 minutes after the beginning of this feed, 174.2 g of tert-dodecyl mercaptan were added. After the end of the first butadiene feed (initially taken monomer), prepolymerization was effected for 30 minutes. 37.41 kg of butadiene and 1.83 kg of styrene were then added in the course of 9 hours. 4 hours after the beginning of this main feed, 174.2 g of dodecyl mercaptan were added. 8 hours after the beginning of this main feed, a further 174.2 g of dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Example e
(10% by Weight, Based on the Total Amount of Monomers in the Initially Taken Mixture and Feed, of Styrene in the Initially Taken Monomer Mixture)

66.14 liters of demineralized water, 339 g of potassium stearate, 177.0 g of sodium bicarbonate and 124.5 g of potassium persulfate were initially taken in a 160 l autoclave and heated to 67° C. 7.85 kg of butadiene and 5.32 kg of styrene were then added in the course of 30 minutes. 10 minutes after the beginning of this feed, 174.2 g of tert-dodecyl mercaptan were added. After the end of the first butadiene feed (initially taken monomer), prepolymerization was effected for 30 minutes. 39.24 kg of butadiene were then added in the course of 9 hours. 4 hours after the beginning of this main feed, 174.2 g of dodecyl mercaptan were added. 8 hours after the beginning of this main feed, a further 174.2 g of dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Examples a to e were repeated with correspondingly reduced amounts in a 2 liter heat flow calorimeter, the heat flow profile of the polymerization reactions being measured.

Table 1 shows the results of the experiments.

The heat flow curves are shown in FIG. 1. With increasing styrene content of the initially taken mixture, a substantially flatter heat flow profile is obtained.

Figure 2:
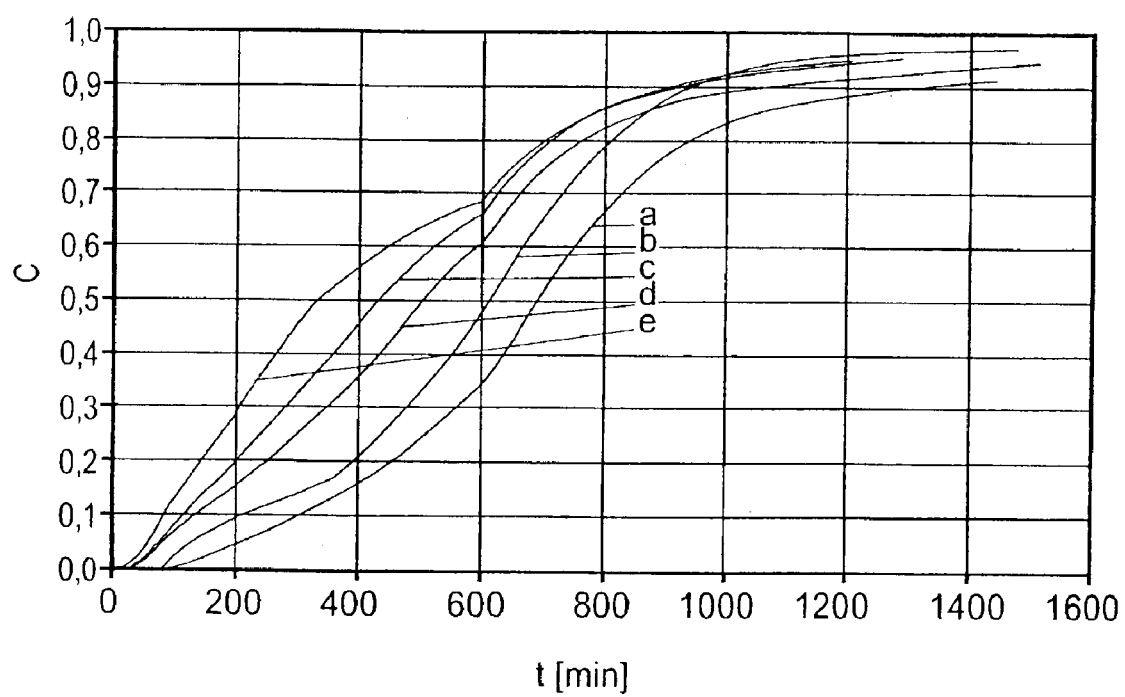
FIG. 2 shows the corresponding conversion/time curves.

FIG. 2 shows the corresponding conversion/time curves.

Preparation of ABS Graft Copolymers and Blending with PSAN (Polystyrene/Acrylonitrile Copolymer) to Give ABS Molding Materials Graft Variant 1

Comparative Example (CE) f and Examples g–j 4427.8 g of a polybutadiene latex, prepared according to Examples a–e, were introduced into a stirred 10 l flask and heated to 75° C. The solids content of the polybutadiene latex was 43.8% by weight. During the heating-up, 387.9 g of a 10% strength by weight dispersion of poly(ethyl acrylate-co-methacrylamide) were added at 65° C. Thereafter, 198.1 g of a mixture of 80 parts by weight of styrene and 20 parts by weight of acrylonitrile were added and prepolymerization was effected for 15 minutes. 990.5 g of the same monomer mixture were then added in the course of 3 hours. Two hours after the beginning of this feed, the temperature was increased to 80° C. After the end of the feed, 2.38 g of potassium persulfate were added and postpolymerization was carried out for 1.5 hours. After cooling, a dispersion of an antioxidant was added to the dispersion.

Graft Variant 2

Comparative Example k and Examples l–o 4427.8 g of a polybutadiene latex, prepared according to Examples a–e, and 5.9 g of tert-dodecyl mercaptan were introduced into a stirred 10 l flask and heated to 75° C. The solids content of the polybutadiene latex was 43.8% by weight. During the heating-up, 387.9 g of a 10% strength by weight dispersion of poly(ethyl acrylate-co-methacrylamide) were added at 65° C. Thereafter, 198.1 g of a mixture of 80 parts by weight of styrene and 20 parts by weight of acrylonitrile were added and prepolymerization was effected for 15 minutes. 990.5 g of the same monomer mixture were then added in the course of 3 hours. Two hours after the beginning of this feed, the temperature was increased to 80° C. After the end of the feed, 2.38 g of potassium persulfate were added and postpolymerization was carried out for 1.5 hours. After cooling, a dispersion of an antioxidant was added to the dispersion.

The properties of the rubber are shown in Tables 2 and 4.

The polybutadiene dispersions grafted according to graft variants 1 and 2 were precipitated in $MgSO_4$ solution and compounded with 70% by weight of PSAN to give ABS molding materials.

The properties of the molding materials are shown in Table 3.

In all the Tables below, the meanings are as follows:

| | |
|---|---|
| SC: | Solids content [%] |
| t(90% conversion): | Time taken to reach 90% conversion [h] |
| $Q_{max}$: | Maximum heat flow [watt/kg solids content] |
| SI: | Swelling index |
| Gel: | Gel content [%]; the gel content indicates the crosslinked fraction of the rubber particle. |
| $d_{50}$: | Weight average particle diameter [nm]; indicates the particle diameter at which 50% by weight of all particles have a larger particle diameter and 50% by weight of all particles have a smaller particle diameter. |
| $(d_{90}-d_{10})/d_{50}$: | The $d_{10}$ value indicates the particle diameter at which 10% by weight of all particles have a smaller diameter and 90% by weight have a larger diameter. Accordingly, the $d_{90}$ value indicates the particle diameter at which 90% by weight of all particles have a smaller diameter and 10% by weight have a larger diameter. The quotient $(d_{90}-d_{10})/d_{50}$ characterizes the width of the particle size distribution. The smaller this value, the narrower is the distribution. |
| $a_K$: | Charpy notched impact strength [kJ/m²]; this was determined using standard small bars by the impact bending test according to ISO 179-2/1 eA (S) at room temperature (RT) and −40° C. |
| Vicat B: | Vicat B temperature [° C.]; the heat distortion resistance according to Vicat was determined using small pressed sheets according to 150306/B with a load of 50 N and a heating rate of 50 K/h. |
| $a_D$: | Total penetration energy; this was determined according to ISO 6603-2 using round disks or 40-40 mm rectangular panels by the Plastechon test at 23° C. |
| $T_g$: | Glass transition temperature [° C.]. |
| MVR: | Melt volume rate according to DIN 53735/30 at 220° C. and 10 kg load |

TABLE 1

| Example | a(CE) | c | d | e |
|---|---|---|---|---|
| SC [%] | 44.1 | 43.9 | 43.3 | 43.7 |
| t(90% conversion) [h] | 21.5 | 15.3 | 17.8 | 15.3 |
| $Q_{max}$ [watt/kg solids content] | 44 | 38 | 43 | 32 |
| SI | 20 | 21 | 34 | 20 |
| Gel [%] | 80 | 78 | 69 | 78 |
| $d_{50}$ [nm] | 83 | 105 | 90 | 111 |
| $(d_{90}-d_{10})/d_{50}$ | 0.530 | 0.457 | 0.589 | 0.387 |

TABLE 2

| Example | Graft variant | SI | Gel [%] | $d_{50}$ [nm] | $(d_{90}-d_{10})/d_{50}$ |
|---|---|---|---|---|---|
| f(CE) | 1 | 9.38 | 87.99 | 130 | 2.886 |
| k(CE) | 2 | 12.86 | 78.45 | 124 | 3.030 |
| h | 1 | 12.03 | 80.27 | 170 | 2.132 |
| m | 2 | 15.65 | 70.28 | 149 | 2.501 |
| i | 1 | 11.06 | 83.58 | 174 | 2.150 |
| n | 2 | 15.76 | 72.41 | 156 | 2.470 |
| j | 1 | 10.43 | 85.51 | 197 | 1.934 |
| o | 2 | 12.4 | 79.44 | 179 | 2.348 |

TABLE 3

| Example | Graft variant | $a_k$(RT) [kJ/m²] | $a_K$[−40° C.] [kJ/m²] | $a_D$ [Nm] | Vicat B [° C.] | MVR (220/10) [ml/10 min] |
|---|---|---|---|---|---|---|
| f(CE) | 1 | 22.5 | 10.6 | 19.6 | 99.7 | 12.0 |
| k(CE) | 2 | 28.2 | 8.5 | 25.1 | 98.5 | 13.0 |
| h | 1 | 19.7 | 9.8 | 23.7 | 97.6 | 12.3 |
| m | 2 | 26.6 | 10.6 | 25.2 | 98.3 | 13.9 |
| i | 1 | 18.3 | 8.1 | 20.0 | 97.7 | 12.6 |
| n | 2 | 30.3 | 7.7 | 29.7 | 97.3 | 14.4 |
| j | 1 | 19.6 | 7.4 | 28.8 | 97.7 | 11.8 |
| o | 2 | 25.4 | 8.1 | 32.3 | 97.5 | 14.6 |

The mechanical properties of the blends are at a constant level.

TABLE 4

| Example | Graft variant | $T_g$[° C.] |
|---|---|---|
| f(CE) | 1 | −88 |
| h | 1 | −83 |
| i | 1 | −80 |
| j | 1 | −78 |

The glass transition temperature of the rubber increases only disproportionately relative to the styrene content, which indicates a heterogeneous structure of the graft rubber particles.

We claim:

1. A process for the preparation of polybutadiene latex, in which butadiene is polymerized by a free radical emulsion polymerization reaction in the presence of initiator and, if required, dispersants and further conventional assistants, wherein the polymerization is carried out in the presence of reactive comonomers in such a way that a beat flow of 43 watt/kg solids content of the polymerization mixture is not exceeded further comprising a heat flow profile with:

during a first period of 10–700 minutes, a change in the heat flow per unit time of 0.01–0.5 watt/(kg·min);

during a subsequent second period of 0–600 minutes, a change in the heat flow per unit time of −0.1–0.1 watt/(kg·min);

during a subsequent third period of 10–1000 min, a change in the heat flow per unit time of <0 watt/(kg·min), wherein the polymerization is carried out by a semi-batch procedure in which (a) in a first stage, a portion of butadiene and at least one portion of reactive comonomer in the form of an aqueous emulsion are initially taken with a thermal polymerization initiator and, if required, dispersants and further conventional assistants and the polymerization is initiated, (b) in a second stage, the remaining amount of butadiene and, if required, the remaining amount of reactive comonomer are added undiluted or in the form of an aqueous emulsion, if required with dispersants and, if required, further conventional assistants, as a feed.

2. A process for the preparation of polybutadiene latex, in which butadiene is polymerized by a free radical emulsion polymerization reaction in the presence of initiator and, if required, dispersants and further conventional assistants, wherein the polymerization is carried out in the presence of reactive comonomers in such a way that a heat flow of 43 watt/kg solids content of the polymerization mixture is not exceeded, further comprising a heat flow profile with:

during a first period of 10–700 minutes, a change in the heat flow per unit time of 0.01–0.5 watt/(kg·min);

during a subsequent second period of 0–600 minutes, a change in the heat flow per unit time of −0.1–0.1 watt/(kg·min);

during a subsequent third period of 10–1000 min, a change in the heat flow per unit time of <0 watt/(kg·min).

3. A process as claimed in claim 1, wherein the total amount of reactive comonomer is initially taken.

4. A process as claimed in claim 1, wherein the total amount of reactive comonomer is from 3 to 20% by weight of the total amount of monomers (butadiene+reactive comonomer).

5. A process as claimed in claim 1, wherein the reactive comonomer is styrene.

6. A process for the preparation of butadiene graft copolymers, in which a polybutadiene latex is prepared in the form of a grafting base by a process as claimed in claim 1 and (c) in a further step, a graft layer comprising at least one vinylaromatic monomer, acrylonitrile and, if required, further ethylenically unsaturated monomers is grafted on.

7. A process as claimed in claim 6, wherein step (c) is carried out in the presence or in the absence of a molecular weight regulator.

8. A process as claimed in claim 2, wherein the polymerization is carried out by a semi-batch procedure in which (a) in a first stage, a portion of butadiene and at least one portion of reactive comonomer in the form of an aqueous emulsion are initially taken with a thermal polymerization initiator and, if required, dispersants and further conventional assistants and the polymerization is initiated, (b) in a second stage, the remaining amount of butadiene and, if required, the remaining amount of reactive comonomer are added undiluted or in the form of an aqueous emulsion, if required with dispersants and, if required, further conventional assistants, as a feed.

9. A process as claimed in claim 2, wherein the total amount of reactive comonomer is initially taken.

10. A process as claimed in claim 2, wherein the total amount of reactive comonomer is from 3 to 20% by weight of the total amount of monomers (butadiene+reactive comonomer).

11. A process as claimed in claim 2, wherein the reactive comonomer is styrene.

12. A process for the preparation of butadiene graft copolymers, in which a polybutadiene latex is prepared in the form of a grafting base by a process as claimed in claim 8 and (c) in a further step, a graft layer comprising at least one vinylaromatic monomer, acrylonitrile and, if required, further ethylenically unsaturated monomers is grafted on.

13. A process as claimed in claim 12, wherein step (c) is carried out in the presence or in the absence of a molecular weight regulator.

* * * * *